Patented Sept. 23, 1952

2,611,706

UNITED STATES PATENT OFFICE 2,611,706

FAT COMPOSITION FOR INFANTS' FOOD

Finn W. Bernhart, Holt, and John B. Hassinen, Mason, Mich., assignors to Wyeth Incorporated, Philadelphia, Pa., a corporation of Delaware No Drawing. Application December 21, 1949, Serial No. 134,344

13 Claims. (Cl. 99—118)

This invention relates to a novel food composition having a milk base, which is particularly adapted when ingested to promote the growth of acid-forming bacteria in the human colon. Our composition contains a carbohydrate such as lactose, dextrin, or inulin that is incompletely absorbed in the stomach or small intestine, and its fat component consists of a blend of food fats, at least one being of vegetable origin, that is free of $C_4$–$C_{10}$ saturated fatty acids, contains only a small percentage of $C_{12}$–$C_{14}$ saturated fatty acids and contains a large fraction of unsaturated food fatty acids a substantial portion of which is oleic acid. Our food composition is particularly adapted to be used as an infants' food, but is also well adapted to general dietetic use.

Since the days of Metchnikoff's studies (see for example Étude sur la Nature Humaine, Paris, 1903, and Essais Optimistes, Engl. translation, London, 1917), the relationship of intestinal flora to human well-being has been the subject of many investigations and has aroused considerable controversy. It is now widely accepted that a predominance of acid-forming bacteria such as L. bifidus in the colon and stools is desirable. More particularly it has been shown that the stools of normal breast-fed infants have a flora predominating in acid-forming bacteria of the L. bifidus type (e. g. gram positive rods 95–100%) and a somewhat more acid reaction (e. g. in the neighborhood of pH 5.9), than is the case with normal infants fed on a modified cow's milk formula (gram-positive rods in the neighborhood of 50% and reaction in the neighborhood of pH 7).

The beneficial effect of an acid-forming microflora in the colon is believed due in whole or in large part to the sensitivity of putrefactive bacteria to acid; their activity as a rule ceasing at pH values less than 6.

Many efforts have been made to establish a favorable colonic flora by special dieting, as by ingesting large amounts of fermented milk, such as yoghurt, kumiss, and the like, but such results have not, in general, been successful.

Orla-Jensen and his co-workers have pointed out (J. Gerontology, vol. 4 (1949), 5–15) that widely different species of lactic acid bacteria exist and are more or less specific to different animal species. They state (page 7):

"Most of the lactic acid bacteria of milk cannot thrive at all in our intestinal canal. Hence in the feces of people who daily consume sour milk or Yoghourt one rarely finds lactic acid bacteria differing from those found in people who do not consume these products.

"The predominant lactic acid bacteria in the feces of healthy persons are the so-called enterococci, two rod-shaped bacteria, Thermobacterium intestinale (formerly called Bacillus acidophilus), and the forked anaerobic Bacterium bifidum which are found in large numbers. The latter, which was originally thought to be found only in the feces of babies, is in fact present in large numbers in the feces of adults and may sometimes constitute half of the bacterial population."

The same authors note further that a requisite for the establishment of a favorable acid-forming colonic flora is that sugar be available in the colon. Since the ordinary food sugars, sucrose, dextrose and fructose, in dietary amounts are completely absorbed in the small intestine, another sugar must be provided; the choice seems limited by practical considerations ordinarily to lactose and dextrin with inulin as a further choice under special circumstances.

More recently it has been found that the food fats present in the colon play a controlling part in the development of an acid-forming microflora, certain fractions of these fats being toxic to the acid-forming bacteria.

It is one object of our invention to provide a milk-base food composition the fat component of which is non-toxic to beneficent acid-forming bacteria in the human colon.

It is another object of our invention to provide such a composition in an economical manner without the necessity of expensive chemical processing of the fat constituents.

It is a further object of our invention to provide a food composition containing the non-toxic fat component together with an adequate amount of lactose, dextrin, or inulin to promote the growth of beneficent acid-forming bacteria such as L. bifidus in the human colon when ingested as a food.

Other objects and advantages of our invention will be apparent to those skilled in the art from the following description.

We have discovered that a readily digestible fat component which is non-toxic to L. bifidus can be made by blending easily available food fats, provided the fats are so chosen that the blend will have a satisfactory melting point, be free of glycerides of certain low-molecular weight fatty acids, have a restricted content of glycerides of certain intermediate - molecular - weight fatty acids, and contain glycerides of oleic acid or equivalent unsaturated food fatty acids. Preferably also our fat composition should contain at least one vegetable fat, since the tocopherol content of vegetable fats affords antioxidant protection against development of rancidity.

We use the term "fat" here and in the claims in its broad sense to include both solid fats and fatty oils.

It has been shown that digested cow's milk and the steam distillate of digested cow's milk is toxic in vitro to $L.$ $bifidus$. We have discovered that the lower saturated fatty acids contained in food fats, when tested individually, vary with their molecular weight in their in vitro toxicity to $L.$ $bifidus$. The $C_4$ and $C_6$ acids show little or no toxicity; toxicity rises with molecular weight to a maximum in lauric acid, having a $C_{12}$ skeleton, and then falls off, the acids containing 16 or more carbons ($C_{16}$ ...) being non-toxic. From a practical standpoint, a fat mixture free of $C_4$–$C_{10}$ fatty acids and containing not over about 5 percent $C_{12}$–$C_{14}$ fatty acids, when ingested, is non-toxic to $L.$ $bifidus$. Since this bacillus requires unsaturated fatty acids for its growth, a dietary fat adapted to promote the growth of $L.$ $bifidus$ should have an adequate content of unsaturated food acids such as oleic, linoleic, arachidonic, etc. Practically, we have found that at least a 50 percent content of such acids is desirable, a large fraction being oleic acid. The melting point should be in the range 25°–45° C. The fat mixture must be free of repellent taste and odor.

Expressed analytically, the fat component of our food composition should have a saponification number in the range 190–200, and a Wijs iodine number in the range 55–85.

In utilizing our fat composition in a milk-base food product, we preferably associate it with a sugar or sugar-yielding carbohydrate which is incompletely absorbed in the stomach or small intestine, such as lactose, dextrin, or inulin, lactose in general being preferred. The fat component of our food composition in conjunction with such a carbohydrate exercises a stimulating effect on the growth of $L.$ $bifidus$ in the colon.

Since the keeping qualities of prepared foods are of great importance, we incorporate as a constituent of our composition at least one fatty oil of vegetable origin, preferably a seed oil. The natural tocopherol content of such oils acts as an antioxidant and thus guards the composition against rancidity. Corn oil, cottonseed oil, olive oil, palm oil, peanut oil, sesame oil and soybean oil, for example, are all reported to have a substantial tocopherol content, ranging from about 3 mg./100 g. for palm oil to 70–90 mg./100 g. for refined cottonseed oil; soybean oil has an intermediate content in the neighborhood of 20 mg./100 g.

An example of a satisfactory fat component of a food composition embodying our invention is one containing 50 parts oleo oil, 30 parts corn oil and 19 parts soybean oil. One part of lecithin is added to furnish choline and facilitate the absorption of fats and oil-soluble vitamins.

The fatty acid contribution of each of the fat ingredients to our composition is shown in Table I, based on the average of typical analyses of each of the fats. The percentages of fatty acids shown here and elsewhere in this application are percentages of the total fatty acids present in the fat in question. They are present for the most part in the form of triglycerides. Of course, as in the case of all natural products, the relative amounts of the fatty acids in each constituent is subject to minor variations around the typical average, but the table gives a fair representation of the character of the individual constituents and of the blended fat.

As stated above, such a fat mixture is particularly adapted for incorporation in a milk-base infants' food. Such a food, properly formulated, closely simulates human milk in its functioning, particularly as to weight increase, stimulation of a colonic $L.$ $bifidus$ flora and the formation of acid stools of about pH 5.9. Surprisingly, however, it has been found best not to duplicate exactly the fatty acid constituents of human milk fat. The fat of human milk contains a trace of $C_8$, about 2 percent of $C_{10}$, nearly 5 percent of $C_{12}$, and over 6 percent of $C_{14}$ saturated fatty acids, these acids singly being definitely toxic to $L.$ $bifidus$ in vitro. Whole human milk, however, is not toxic but stimulating to $L.$ $bifidus$. The reason for this apparent paradox is not known; it may conceivably be due to an unidentified protective agent in human milk or to an undetermined complex of other conditions. In any event our composition avoids the necessity of providing a protective agent or the like by containing fat entirely free of $C_{10}$ and lower acids and having only tolerated small percentages of $C_{12}$ and $C_{14}$ acids.

*Table I*

| Fatty Acids | Percent in fat | | | Percent in fat component (calc.) | | | |
|---|---|---|---|---|---|---|---|
| | Oleo Oil | Corn Oil | Soybean Oil | Oleo Oil–50% | Corn Oil–30% | Soybean Oil–19% | Total–99% |
| Saturated: | | | | | | | |
| $C_4$–$C_{10}$ | nil | nil | nil | nil | nil | nil | nil |
| $C_{12}$ Lauric | 0.1 | nil | nil | 0.05 | nil | nil | 0.05 |
| $C_{14}$ Myristic | 3.0 | nil | 0.1 | 1.50 | nil | 0.02 | 1.52 |
| $C_{16}$ Palmitic | 29.0 | 8.0 | 8.0 | 14.50 | 2.40 | 1.52 | 18.42 |
| $C_{18}$ Stearic | 20.0 | 3.5 | 4.0 | 10.00 | 1.05 | 0.76 | 11.81 |
| $C_{20}$ Arachidic | 0.8 | 0.5 | 0.6 | 0.40 | 0.15 | 0.01 | 0.56 |
| $C_{22}$ Behenic | nil | nil | nil | nil | nil | nil | nil |
| $C_{24}$ Lignoceric | nil | 0.2 | nil | nil | 0.06 | nil | 0.06 |
| Unsaturated: | | | | | | | |
| $C_{14}$ Myristoleic | 0.5 | nil | 0.1 | 0.25 | nil | 0.02 | 0.27 |
| $C_{16}$ Palmitoleic | 2.0 | nil | 0.2 | 1.0 | nil | 0.04 | 1.04 |
| $C_{18}$ Oleic | 42.0 | 46.0 | 28.0 | 21.0 | 13.80 | 5.33 | 40.13 |
| $C_{18}$ Linoleic | 2.0 | 42.0 | 54.0 | 1.0 | 12.6 | 10.25 | 23.85 |
| $C_{18}$ Linolenic | 0.5 | nil | 5.0 | 0.25 | nil | 0.95 | 1.20 |
| $C_{20}$ Arachidonic | 0.1 | nil | nil | 0.05 | nil | nil | 0.05 |
| Total | 100.0 | 100.2 | 100.0 | 50.00 | 30.06 | 18.90 | 98.96 |

Iodine number (Wijs), 84.
Saponification number, 195.
Melting point, 29° C.

While Table I illustrates an embodiment of our fat component made up of oleo, corn and soybean oils, other blends of food oils may be used, as will be well understood by those skilled in the art, provided they conform to the requirements set forth above and in the appended claims.

Another desirable fat blend is the following, which contains palm oil:

| | | |
|---|---|---|
| Oleo oil | 55% | Oleic+linoleic acids 51%. |
| Corn oil | 10 | $C_4$-$C_{10}$ acids nil. |
| Soybean oil | 10 | $C_{12}$-$C_{14}$ acids 2.2%. |
| Palm oil | 25 | Iodine No. 61. |
| | | Saponification value 195. |
| Total | 100% | |

Additional fat blends meeting the requirements of our invention are:

| | | |
|---|---|---|
| Oleo stock | 25% | Oleic+linoleic acids 59%. |
| Oleo oil | 30 | $C_4$-$C_{10}$ acids nil. |
| Soybean oil | 22 | $C_{12}$-$C_{14}$ acids 1.8%. |
| Soybean lecithin | 3 | Iodine No. 78. |
| Cottonseed oil | 20 | Saponification value 194. |
| Total | 100% | |

| | | |
|---|---|---|
| Mutton tallow | 25% | Oleic+linoleic acids 60%. |
| Lard | 40 | $C_4$-$C_{10}$ acids nil. |
| Cottonseed oil | 15 | $C_{12}$-$C_{14}$ acids 0.13%. |
| Soybean oil | 10 | Iodine No. 76. |
| Corn oil | 10 | Saponification value 194. |
| Total | 100% | |

One example of a milk-base food product incorporating our fat component described in Table I has the following formulation:

Table II

| | Wet Basis | Approximate Dry Basis |
|---|---|---|
| | Percent | Percent |
| Skim cows' milk (9% total solids) | 80.6 | 27.3 |
| Edible lactose | 11.1 | 41.8 |
| Sodium caseinate | 0.7 | 2.6 |
| Fat component of this invention+lecithin | 7.5 | 28.2 |
| Oleo oil (from beef tallow) parts 50 | | |
| Corn oil do 30 | | |
| Soybean oil do 19 | | |
| Lecithin (60% acetone-insol.) do 1 | | |
| Total | 99.9 | 99.9 |

Balance—Minerals and vitamins.

In making this product, the skim milk is preheated to 77° C., drawn into a blending tank and mixed with a previously prepared mixture of the sodium caseinate, lactose and melted fat. During and after blending the mixture is held at pasteurizing temperature for several hours, clarified, homogenized and cooled. The minerals and vitamins are added at suitable points in these operations.

The resulting liquid is concentrated under vacuum to approximately half its original volume and canned for distribution as a liquid milk food concentrate, requiring dilution with water before use. Alternatively it may be spray-dried and distributed as a powdered solid concentrate.

We have found that our fat component permits such concentration without separation of a fat layer. When canned at a concentration requiring dilution with an equal volume of water for use, it has a long shelf life without separation of a fat layer; such creaming as may occur on prolonged storage is readily dispersible by shaking with or without gentle warming.

Such a food composition may also be dried to a powder which is readily soluble and dispersible in water, as by spray-drying, drying in a vacuum drum drier or the like. In this case the sodium caseinate is preferably omitted from the formulation.

The milk food described above (Table II) has been tested clinically with infants and found to yield excellent results in providing satisfactory weight gain, increasing the L. bifidus flora and correcting deficient acidity of the stools.

As an example, three infants ranging in age from one to two months and in weight from 6½ to 7½ lb., who had previously been fed a conventional evaporated-milk formula, were put on a diet consisting of our above described milk food and observed for 52 days. The percentage of gram positive rods in the flora of the stools (indicating acid-forming bacteria), the pH of the stools and the weight of the infants were determined periodically. At the start approximately 50 percent of the stool flora was gram positive rods and the pH was approximately 7. At the end of the observation period the gram positive flora had increased to 80-90 percent and the pH had dropped to an average of 5.9. The infants had increased in weight 3 lb. to 9½–10½ lb. This is a gain of approximately 1 oz. per day. The infants tolerated the food well and were in excellent condition at the end of the observation period.

Additional details are sown in Table III.

Table III

| Infant | Lw | Mk | Mh |
|---|---|---|---|
| Sex | female | female | male |
| Weight: at birth | 4 lb. 14½ oz. | 7 lb. 4½ oz. | 6 lb. 5 oz. |
| 2 weeks before starting new diet | 6 lb. 3½ oz. | | 5 lb. 13 oz. |
| 4 days before starting new diet | 7 lb. 4 oz. | 7 lb. 8¼ oz. | 6 lb. 8 oz. |
| At start of new diet: age, days | 60 | 29 | 37 |
| Percent Gram positive rods in stool flora | 63 | 55 | 53 |
| pH of stools | 7.2 | 7.4 | 6.6 |
| After 24 days on new diet: Weight | 8 lb. 11 oz. | 9 lb. 6 oz. | 8 lb. 4 oz. |
| After 27 days on new diet: | | | |
| Percent Gram positive rods in stool flora | 89 | 87 | 95 |
| pH of stools | 5.7 | 5.1 | 5.6 |
| After 52 days on new diet (end of observation period): | | | |
| Weight | 10 lb. 8 oz. | 10 lb. 0 oz. | 9 lb. 8 oz. |
| Percent Gram positive rods in stool flora | 91 | 80 | 90 |
| pH of stools | 5.7 | 6.4 | 5.0 |

Comparative feedings were also carried out with a well known proprietary infants' food in all respects identical with that disclosed in Table II except that its fat component had a substantial percentage of $C_6$–$C_{14}$ fatty acids. With this diet the stools had substantially the same microflora and pH as with the evaporated milk formula. This indicates that the favorable results in these respects obtained with our milk food were due to the selected fatty-acid content of the fat component in our milk food.

The composition of such a food may be varied within certain limits without losing the advantages of our invention. Practical approximate limits on a dry basis are:

| | Percent |
|---|---|
| Skim-milk solids | 25–45 |
| Lactose | 35–60 |
| Casein salt | 0–5 |
| Fat component of this invention | 15–40 |

We claim:

1. A food composition comprising a carbohydrate component selected from the group consisting of lactose, dextrin, inulin and mixtures thereof, and a fat component consisting of a blend of a plurality of food fats, at least one of which is of vegetable origin, said blend containing only those saturated fatty acids having more than 10 carbon atoms in the molecule, containing not over 5% of $C_{12}$–$C_{14}$ saturated fatty acids, containing at least 50% of unsaturated fatty acids of which a substantial fraction is oleic acid, said percentages being by weight based on the total weight of the fatty acids present in said fat component, said blend of a plurality of food fats having a saponification number within the range 190–200, a Wijs iodine number within the range 55–85, and a melting point within the range 25–45° C.

2. In a milk-base food composition, in combination with milk solids derived from skim milk and an added carbohydrate selected from the group consisting of lactose, dextrin, inulin and mixtures thereof: a fat component consisting of a blend of food fats, at least one of a plurality of which is of vegetable origin, the blend containing only those saturated fatty acids having more than 10 carbon atoms in the molecule containing only a small percentage of $C_{12}$–$C_{14}$ saturated fatty acids, containing at least 50 percent unsaturated fatty acids of which a substantial fraction is oleic acid, the fatty acid percentages being based on the total fatty acids in the fat, and having a saponification number falling within the range 190–200, a Wijs iodine number within the range 55–85 and a melting point within the range 25–45° C. whereby said composition on ingestion promotes the growth of acid forming bacteria in the human colon.

3. A food composition as defined in claim 2 in which the carbohydrate is lactose.

4. A food composition as defined in claim 2 in which the fat component consists of oleo oil, corn oil and soybean oil.

5. A food composition as defined in claim 2 in which the fat component consists of oleo oil, corn oil, soybean oil and palm oil.

6. A food composition as defined in claim 2 in which the fat component consists of oleo stock, oleo oil, soybean oil, cottonseed oil and a small amount of soybean lecithin.

7. A food composition as defined in claim 2 in which the fat component consists of mutton tallow, lard, cottonseed oil, soybean oil and corn oil.

8. A food composition comprising skim-milk solids, lactose, minerals, vitamins, lecithin, and a fat component consisting of a blend of a plurality of food fats, at least one of which is of vegetable origin, the blend containing only those saturated fatty acids having more than 10 carbon atoms in the molecule, containing not over 5 percent $C_{12}$–$C_{14}$ saturated fatty acids, containing at least 50 percent unsaturated fatty acids of which a substantial fraction is oleic acid, the fatty acid percentages being based on the total fatty acids in the fat, and having a melting point in the range 25°–45° C., whereby said composition on ingestion promotes the growth of acid-forming bacteria in the human colon.

9. A food composition comprising a homogenized mixture of skim-milk solids, lactose and a fat component in the following percentage ranges:

| | Percent |
|---|---|
| Skim-milk solids | 25–45 |
| Lactose | 35–60 |
| Fat component | 15–40 | the fat component consisting of a blend of a plurality of food fats, at least one of which is of vegetable origin, the blend containing only those saturated fatty acids having more than 10 carbon atoms in the molecule, containing not over 5 percent $C_{12}$–$C_{14}$ saturated fatty acids, containing at least 50 percent unsaturated fatty acids of which a substantial fraction is oleic acid, the fatty acid percentages being based on the total fatty acids in the fat, and having a melting point in the range 25°–45° C., whereby said composition on ingestion promotes the growth of acid-forming bacteria in the human colon.

10. A food composition as defined in claim 9, being in concentrated form adapted to be prepared for use by dilution with water.

11. A food composition as defined in claim 10 in the form of a creamy liquid adapted to be prepared for use by dilution with an equal volume of water.

12. A food composition as defined in claim 10 in the form of a dry powder.

13. A food composition comprising a homogeneous mixture of skim milk solids, an added carbohydrate selected from the group consisting of lactose, dextrin, inulin and mixtures thereof, a fat component, vitamins and minerals, said fat component being present in an amount ranging from 15% to 40% of the dry weight of said food composition, said fat component consisting of a blend of a plurality of food fats comprising at least one vegetable oil of substantial tocopherol content selected from the group consisting of corn oil, cottonseed oil, olive oil, palm oil, peanut oil, sesame oil and soybean oil, said fat component containing only those saturated fatty acids having more than 10 carbon atoms in the molecule, containing not over 5% of $C_{12}$–$C_{14}$ saturated fatty acids, and containing at least 50% of unsaturated fatty acids of which a substantial fraction is oleic acid, said percentages being by weight based on the total fatty acid content of said fat component, said blend of food fats being further characterized by a saponification number within the range 190–200, a Wijs iodine number within the range 55–85, and a melting point within the range 25–45° C.

FINN W. BERNHART.
JOHN B. HASSINEN.

(References on following page)

REFERENCES CITED

The following references are of record in the file of this patent:

UNITED STATES PATENTS

| Number | Name | Date |
|---|---|---|
| 782,820 | Bloom | Feb. 21, 1905 |
| 782,821 | Bloom | Feb. 21, 1905 |

OTHER REFERENCES

"Dietotherapy—Clinical Application of Modern Nutrition," by Wohl—W. B. Saunders Company, Philadelphia and London, 1945—pages 474–486, 489 and 490.